US008312634B1

(12) United States Patent
Forsyth

(10) Patent No.: US 8,312,634 B1
(45) Date of Patent: Nov. 20, 2012

(54) POSITIONER AND METHOD OF USE

(76) Inventor: James D. Forsyth, Davenport, IA (US)

( * ) Notice: Subject to any disclaimer, the term of this patent is extended or adjusted under 35 U.S.C. 154(b) by 282 days.

(21) Appl. No.: 12/645,251

(22) Filed: Dec. 22, 2009

Related U.S. Application Data

(60) Provisional application No. 61/203,435, filed on Dec. 22, 2008.

(51) Int. Cl.
*B25H 7/00* (2006.01)
*G01B 3/14* (2006.01)

(52) U.S. Cl. .................. 33/194; 33/1 B; 33/562; 33/613

(58) Field of Classification Search .................... 33/1 B, 33/1 G, 1 K, 12, 13, 194, 197, 562, 563, 566, 33/613; D10/64, 71
See application file for complete search history.

(56) References Cited

U.S. PATENT DOCUMENTS

| | | | | |
|---|---|---|---|---|
| 292,463 | A * | 1/1884 | Bassett | 33/197 |
| 664,910 | A * | 1/1901 | Voight | 33/197 |
| 1,540,991 | A * | 6/1925 | Holmgren | 33/194 |
| 2,634,507 | A * | 4/1953 | Boatwright | 33/197 |
| 3,371,423 | A * | 3/1968 | Paul | 33/666 |
| 3,724,085 | A * | 4/1973 | Wentworth | 33/562 |
| 4,610,092 | A * | 9/1986 | Hafele | 33/613 |
| D288,538 | S * | 3/1987 | Cabaniss, III | D10/62 |
| 4,730,398 | A * | 3/1988 | Stanton | 33/1 K |
| 4,791,731 | A * | 12/1988 | Dickinson et al. | 33/528 |
| 4,928,743 | A * | 5/1990 | Wojtysiak | 160/84.01 |
| 4,998,355 | A * | 3/1991 | Greene | 33/667 |
| 5,107,601 | A * | 4/1992 | Semchuck | 33/759 |
| D399,440 | S * | 10/1998 | Taylor | D10/71 |
| 6,317,996 | B1 * | 11/2001 | Myers et al. | 33/566 |
| 6,785,977 | B1 * | 9/2004 | Crichton | 33/613 |
| 6,931,735 | B1 * | 8/2005 | Clark et al. | 33/194 |
| 7,181,859 | B2 * | 2/2007 | Lai | 33/563 |
| 7,293,368 | B1 * | 11/2007 | Faulk et al. | 33/758 |
| 2002/0116835 | A1 * | 8/2002 | Mills | 33/563 |
| 2008/0078094 | A1 * | 4/2008 | Baumann | 33/566 |

FOREIGN PATENT DOCUMENTS

| | | | |
|---|---|---|---|
| DE | 4100364 | A1 * | 11/1991 |
| WO | WO 2010002310 | A1 * | 1/2010 |

* cited by examiner

*Primary Examiner* — R. A. Smith
(74) *Attorney, Agent, or Firm* — Hamilton IP Law, PC; Jay R. Hamilton; Charles A. Damschen

(57) ABSTRACT

A positioner and method of use thereof, wherein the positioner is comprised of a positioner first and second side. A flap having a flap first and second side may be hingedly mounted to the positioner. Both the positioner first and second sides and flap first and second sides may be fashioned with grids, wherein an aperture may be positioned at each node of each grid, and wherein one indicator corresponds to each apertures. The positioner may be used to easily and accurately position markings adjacent window frames, sills, or other structures having right angles thereon.

13 Claims, 11 Drawing Sheets

POSITIONER AND METHOD OF USE

CROSS REFERENCE TO RELATED APPLICATIONS

This application claims the filing benefit under 35 U.S.C. §119(e) of provisional U.S. Pat. App. No. 61/203,435 filed on Dec. 22, 2008, which is incorporated by reference herein in its entirety.

FIELD OF INVENTION

This invention relates generally to positioning an object adjacent a corner. More specifically, the invention is especially useful for use in positioning window treatments next to the wall recess or window frame adjacent the window.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND

Many people desire to place window treatments adjacent the interior of windows, both in residential and commercial applications. Typically, such treatments are for aesthetic, economical, or functional reasons, but may also be a combination thereof, or for other reasons. Such window treatments are often placed on the interior wall near the window, along the window frame (either the top or the sides), or on the recess adjacent a frameless window. Treatments may be placed in other areas adjacent a window and the examples given above are not meant to be exhaustive.

It is often extremely difficult and time consuming to position a window treatment at equal distances from the window on each side of the window treatment. Typically, this task requires the user to measure a certain distance up from a reference point on each side of the window, and then measure a corresponding distance out from a reference point on each side of the window. Often, this results in unequal spacing on the first and second ends of the window treatment, such that the window treatment is not square with the window.

The only solution to this problem currently available is to measure the relevant distances several times to ensure that the first and second ends of the window treatment are properly placed with respect to the window. The use of a square tool may be employed, but often the result is the same—several measurements must be taken on each side of the window to ensure the window treatment is properly placed.

Accordingly, it is desirable to provide an improved apparatus for positioning a window treatment or other structure on a wall adjacent a window.

SUMMARY OF THE INVENTION

It is an object of the present invention to provide an apparatus for correctly positioning a window treatment or other structure on a wall adjacent a window with reduced time and effort required to position the window treatment or other structure.

It is another object of the present invention to provide a method that will ensure a window treatment or other structure is properly placed.

It is another object of the present invention to provide a method that will allow a user to properly position a window treatment or other structure adjacent a window in an efficient manner.

Other objects and advantages of the present invention will, in part, be apparent from the specification when considered in conjunction with the drawings and claims hereof.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

DETAILED DESCRIPTION - LISTING OF ELEMENTS

Figure 1:
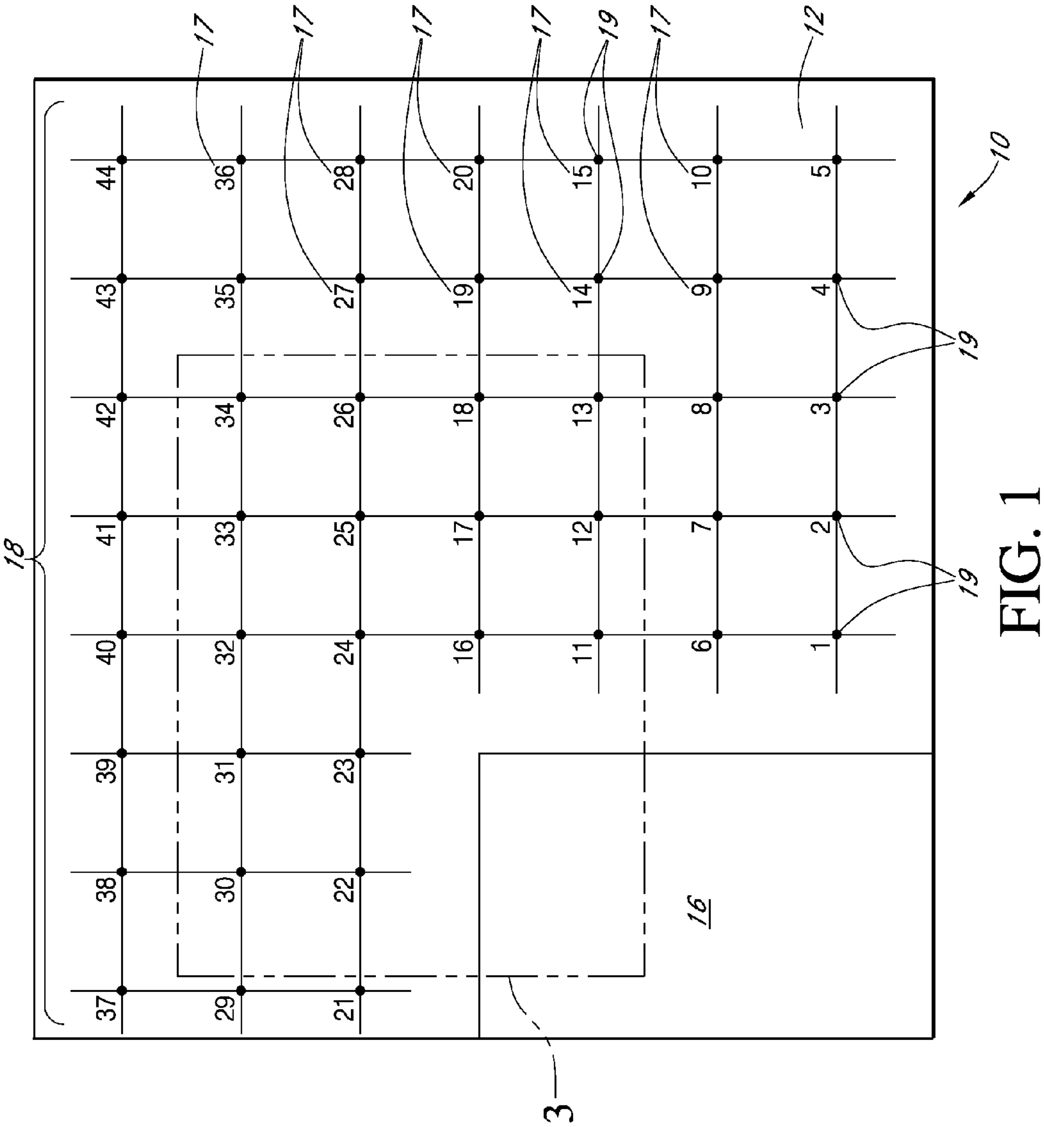
FIG. 1 provides a full view of the positioner first side.

| ELEMENT DESCRIPTION | ELEMENT # |
|---|---|
| Positioner | 10 |
| Positioner First Side | 12 |
| Positioner Second Side | 14 |
| Flap | 16 |
| Indicator | 17 |
| Grid | 18 |
| Aperture | 19 |
| Window frame | 20 |
| Window frame interior side | 22 |
| Window frame interior top | 24 |
| Window frame exterior | 26 |
| Wall | 30 |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Figure 2:
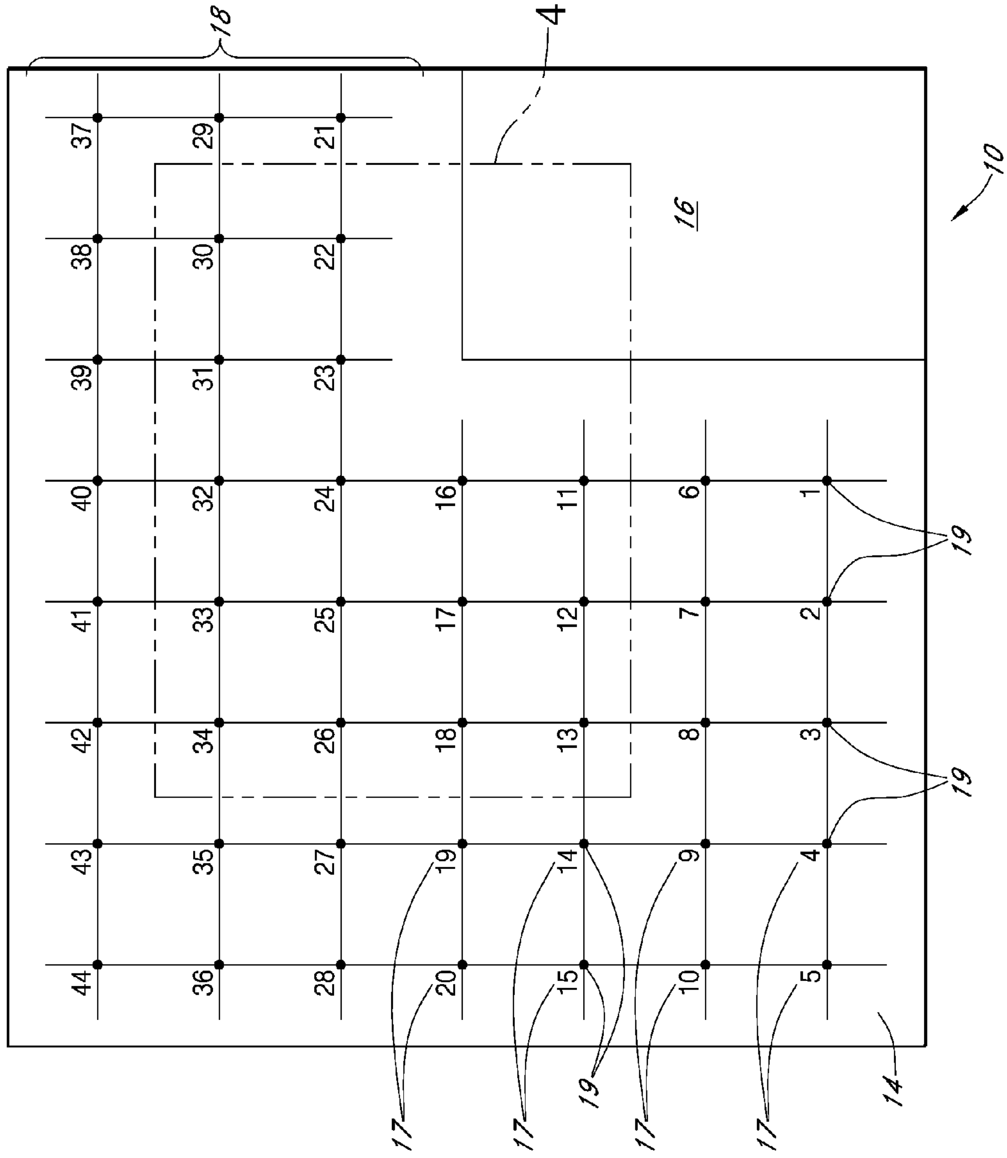
FIG. 2 provides a full view of the positioner second side.

Referring now to the drawings, wherein like reference numerals designate identical or corresponding parts throughout the several views, FIG. 1 provides a full view of the positioner first side 12 for one embodiment of the positioner 10 as disclosed and claimed herein. The positioner 10 has a first and second side, 12, 14 respectively. On both the positioner first and second sides 12, 14 are identical grids 18, which is made evident through a comparison of FIGS. 1 and 2, wherein FIG. 2 shows the positioner 10 as viewed from the positioner second side 14.

In the embodiment as pictured herein, the grid 18 has multiple lines that are spaced approximately one inch from one another in both the vertical and horizontal directions, wherein adjacent vertical lines are parallel to one another and adjacent horizontal lines are parallel to one another, such that the vertical and horizontal lines are perpendicular to one another. The grids 18 on both the positioner first and second sides 12, 14 are identical, and each grid 18 is the same distance from the periphery of the positioner 10. In other embodiments not pictured herein, the lines of each grid 18 are spaced at other distances, such as one centimeter. In still other embodiments not pictured herein, the lines comprising each grid 18 is angled with respect to the periphery of the positioner 10. Accordingly, the lines for each grid 18 may be spaced from one another by any amount and in any orientation within the spirit and scope of the present invention so long as the grid 18 on the positioner first side 12 is identical to the grid 18 on the positioner second side 14, and so long as each grid 18 is the same distance from the positioner 10 periphery.

Figure 3:
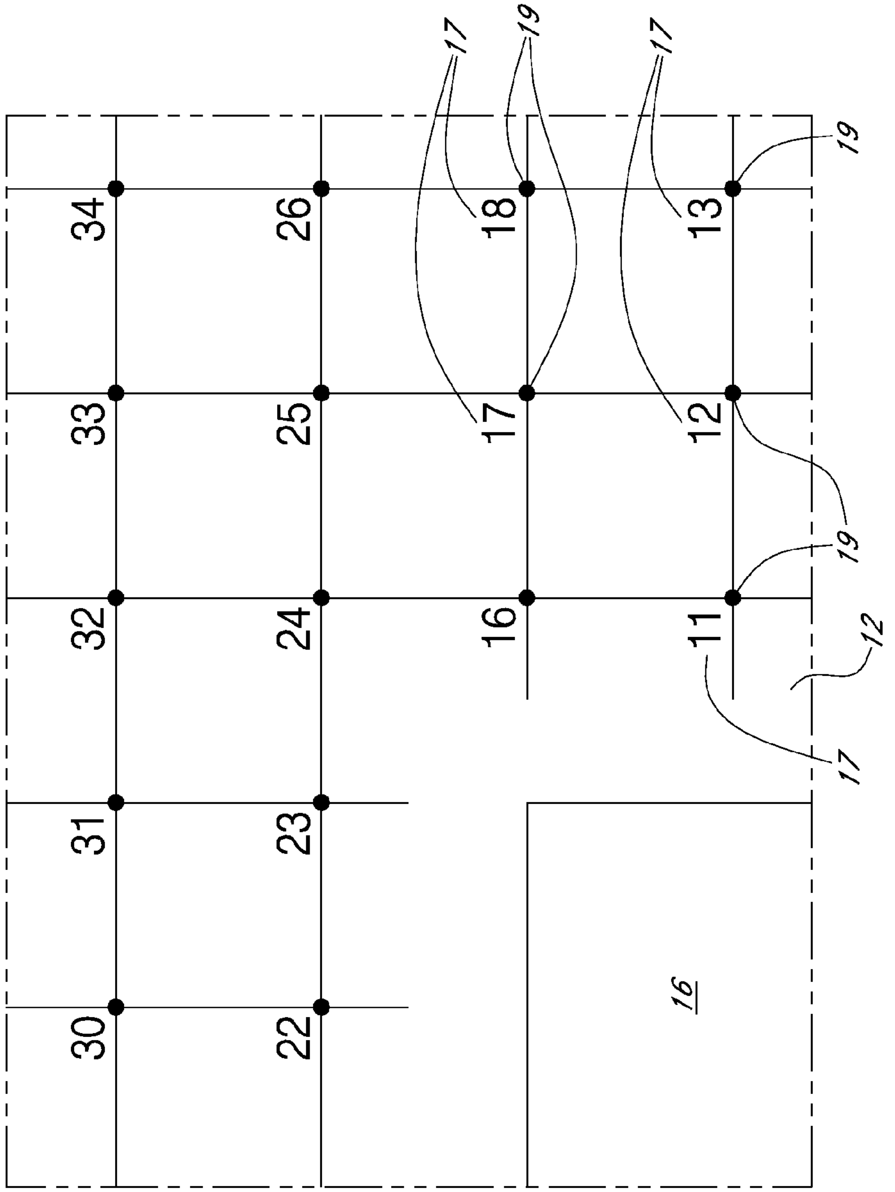
FIG. 3 provides a detailed view of the positioner first side near the flap.
Figure 4:
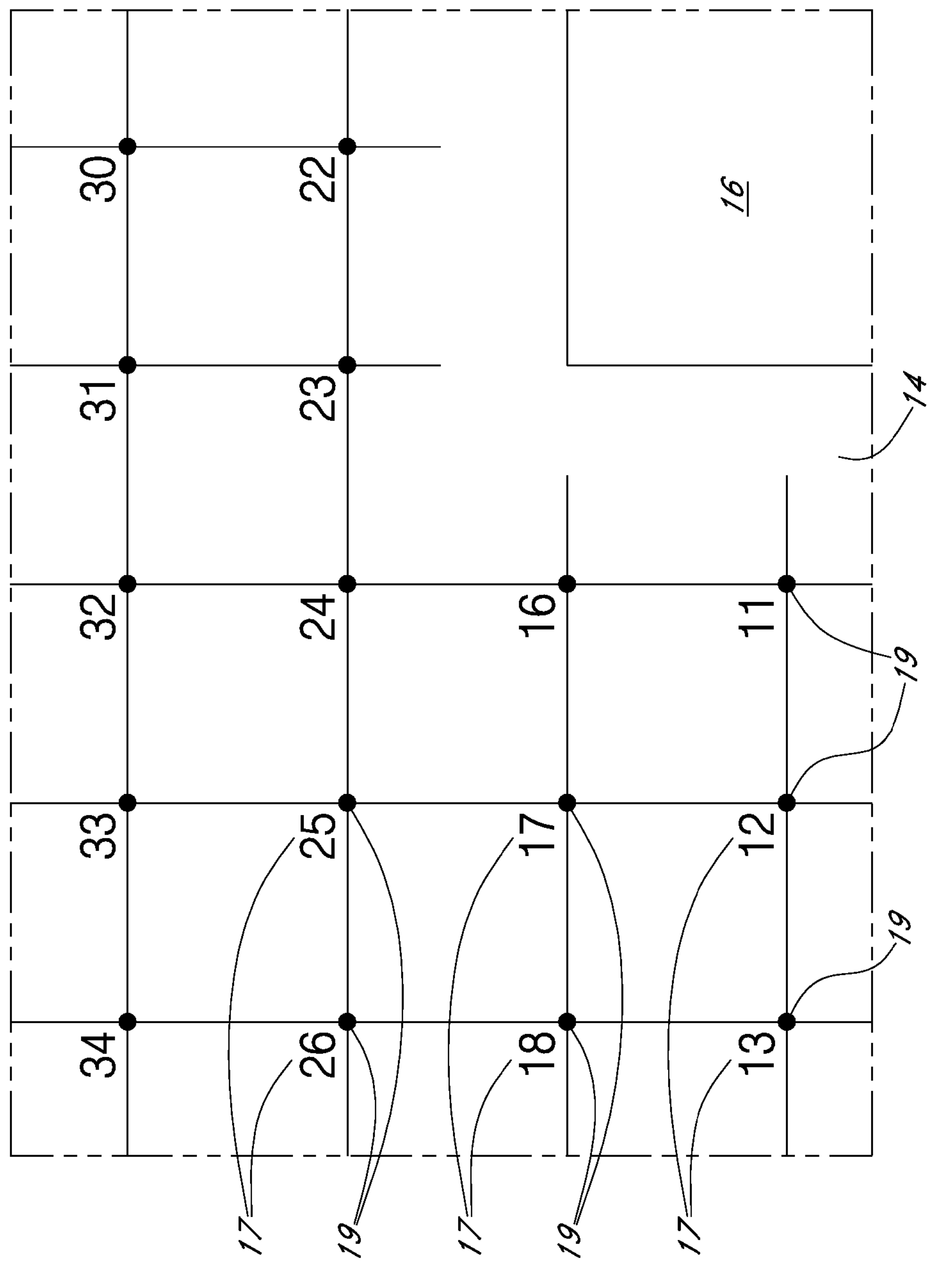
FIG. 4 provides a detailed view of the positioner second side near the flap.

At various places on the grid 18, indicators 17 serve to identify a specific aperture 19. In the embodiment as pictured herein, each indicator 17 is a number having a distinct numerical value. However, in other embodiments not pictured herein, the indicators 17 are letters, and any distinct marking may be used for an indicator 17 without departing from the spirit and scope of the present invention. Each aperture 19 extends from the positioner first side 12 through the positioner 10 to the positioner second side 14. Each indicator 17 corresponds to a specific aperture 19 on both the positioner first and second sides 12, 14. That is, the indicator 17 labeled "32" on the positioner first side 12 shown in FIG. 3 corresponds to the same aperture 19 adjacent the indicator 17 labeled "32" on the positioner second side 14 as shown in FIG. 4. Accordingly, each indicator 17 on the positioner first side 12 matches the corresponding indicator 17 on the positioner second side 14 for a given aperture 19. In the embodiment shown herein, the apertures 19 are located at nodes (i.e., intersections of the lines of each grid 18) of the grids 18. However, in other embodiments not pictured herein, the apertures 19 may be differently positioned. Accordingly, the location of the apertures 19, grids 18, and or indicators 17 in no way limits the scope of the positioner 10 as disclosed and claimed herein.

The positioner 10 may also includes a flap 16 that has first and second sides corresponding to the positioner first and second sides 12, 14. The flap 16 in the embodiment pictured herein is integrally formed with the main portion of the positioner 10, but in other embodiments not pictured herein it may be separately formed and then joined to the positioner 10 through any means know to those skilled in the art, such as flexible polymers, tape, or any other device without departing from the spirit and scope of the positioner 10. FIGS. 3 and 4 show the interface between the flap 16 and positioner first and second sides 12, 14, respectively.

In an embodiment not pictured herein, the flap 16 may also include a separate grid (not shown), apertures (not shown), and corresponding indicators (not shown) fashioned in the same manner as described above for the positioner 10. In another embodiment not pictured herein, the interface between the flap 16 and the positioner 10 may have a small circular cut-out at the top side so that the positioner 10 and/or flap 16 will assuredly be square with the relevant surface. The flap 16 may be made to any size that is convenient without departing from the spirit and scope of the positioner 10 so long as the flap 16 forms a right angle with the positioner 10 at the interface therebetween. Furthermore, if the flap 16 includes a grid (not shown), apertures (not shown), and indicators (not shown), those elements may have different scales and relative positions compared to the grid 18, apertures 19, and indicators 17 on the positioner 10. That is, the grid 18 on the positioner 10 may be at one-inch increments and the grid (not shown) on the flap 16 may be at one-centimeter increments and vice versa. Accordingly, the dimensions of the relative grids 18, apertures 19, and indicators 17 may be varied in an infinite number of ways without departing from the spirit and scope of the positioner 10 as disclosed and claimed herein.

Figure 5:
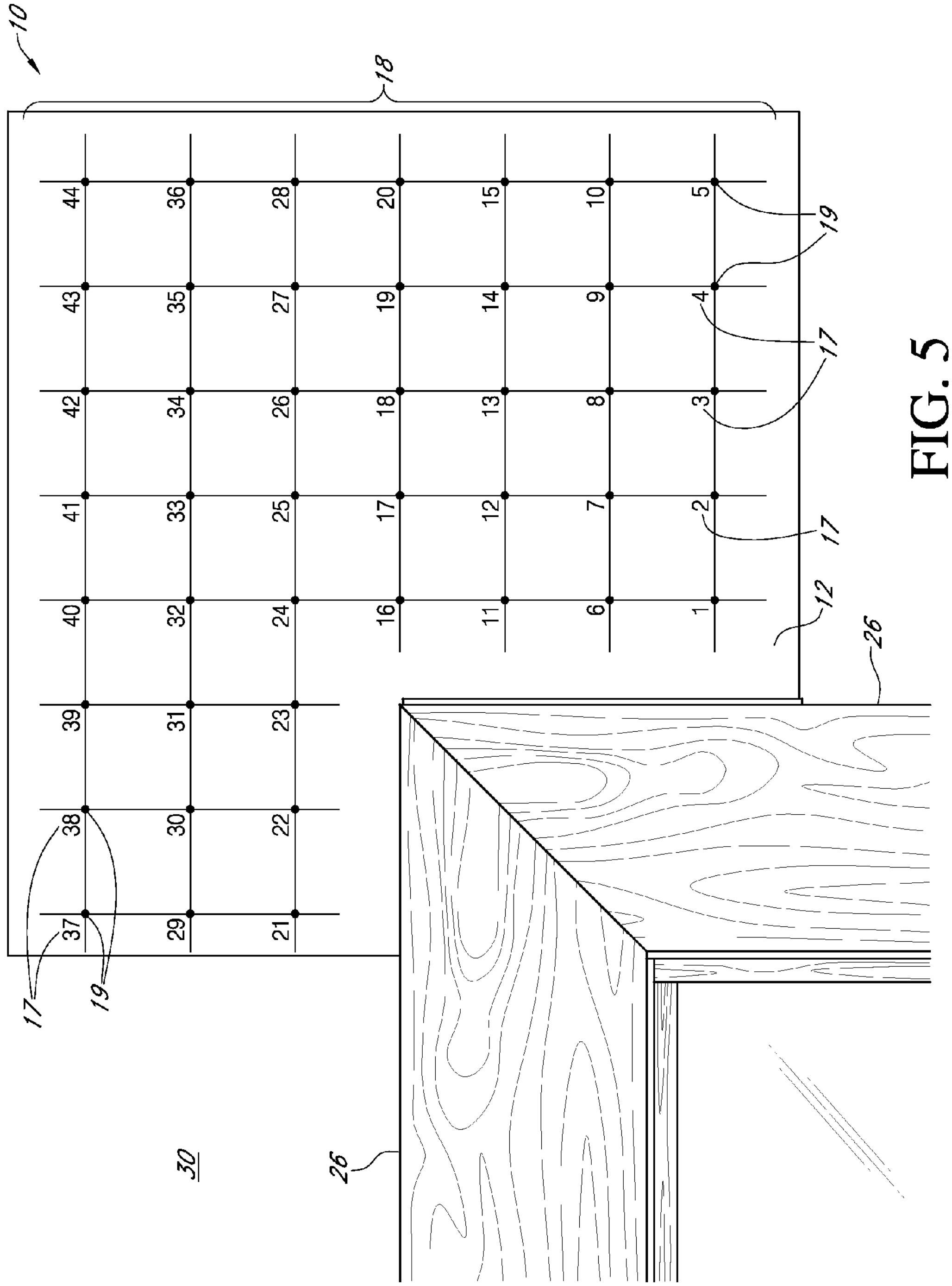
FIG. 5 provides a full view of the positioner first side when the positioner is positioned about a window frame exterior.

The positioner 10 is shown adjacent a window frame exterior 26 in FIG. 5, where the positioner first side 12 is visible and the positioner second side 14 is fitted flush against the wall 30. The positioner 10 is shown adjacent the opposite side of the window frame exterior in FIG. 6, where the positioner first side 12 is fitted flush against the wall 30 and the positioner second side 14 is visible.

Figure 6:
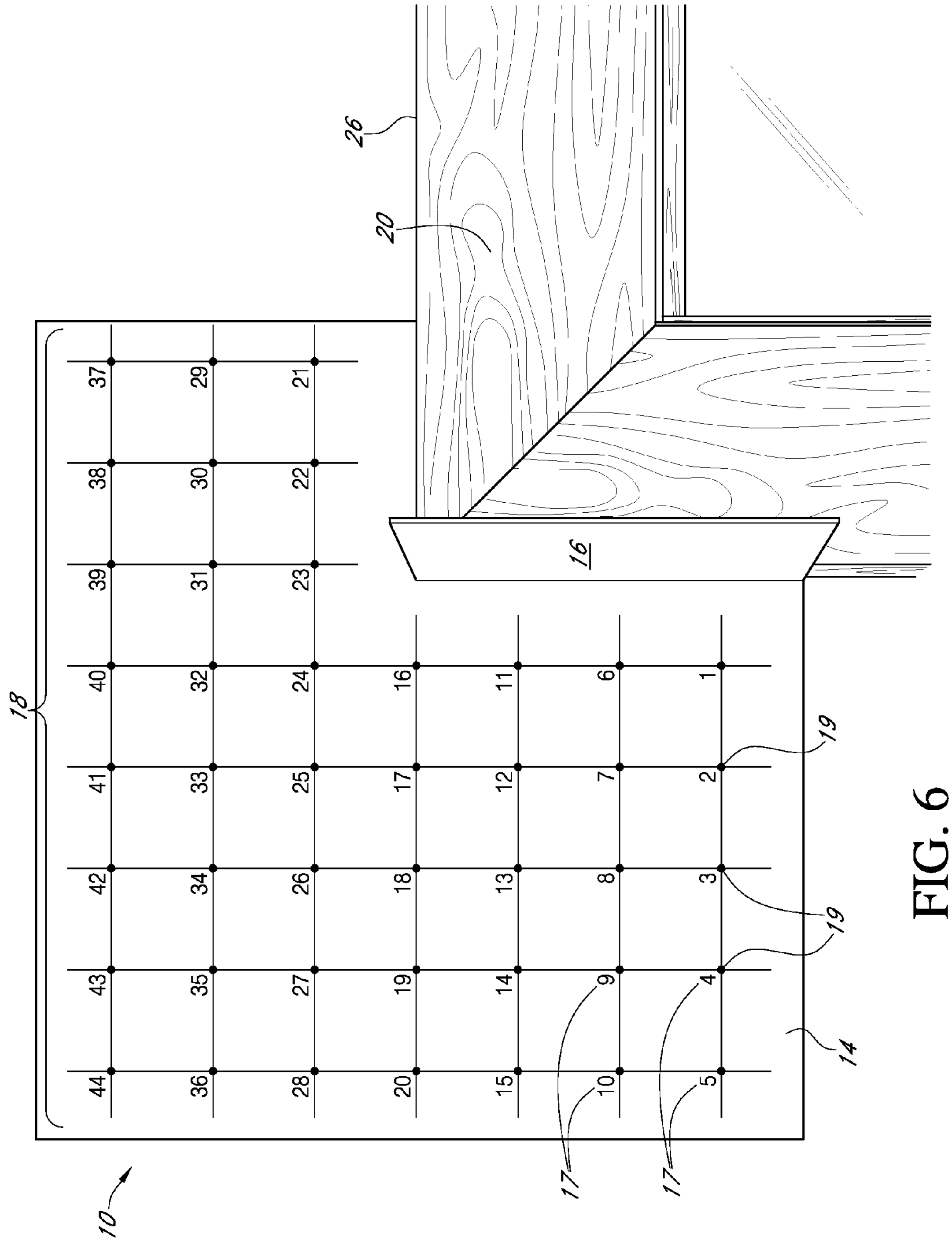
FIG. 6 provides a full view of the positioner second side when the positioner is positioned about the exterior of a window frame.

As shown in FIGS. 5 and 6, the flap 16 pivots with respect to the positioner 10 to allow the positioner 10 to fit flush against the wall 30, wherein the flap may be oriented perpendicularly to the positioner 10. Because the grid 18 is identical on both the positioner first and second sides 12, 14, and because the indicators on both the positioner first and second sides 12, 14 correspond to the same apertures 19, the user may simply mark the desired location of a window treatment with respect to the window frame 20 on one side through the relevant aperture 19, flip the positioner 10 over and mark the location of the other side of the window treatment by using the same indicator 17 and aperture 19. That is, the user may change the orientation of the positioner 10 such that the positioner second side 14 is flush with the wall and adjacent the opposite side of the window frame 20 with respect to the side of the window frame 20 adjacent the positioner 10 with the positioner first side 12 flush with the wall 30.

Figure 7:
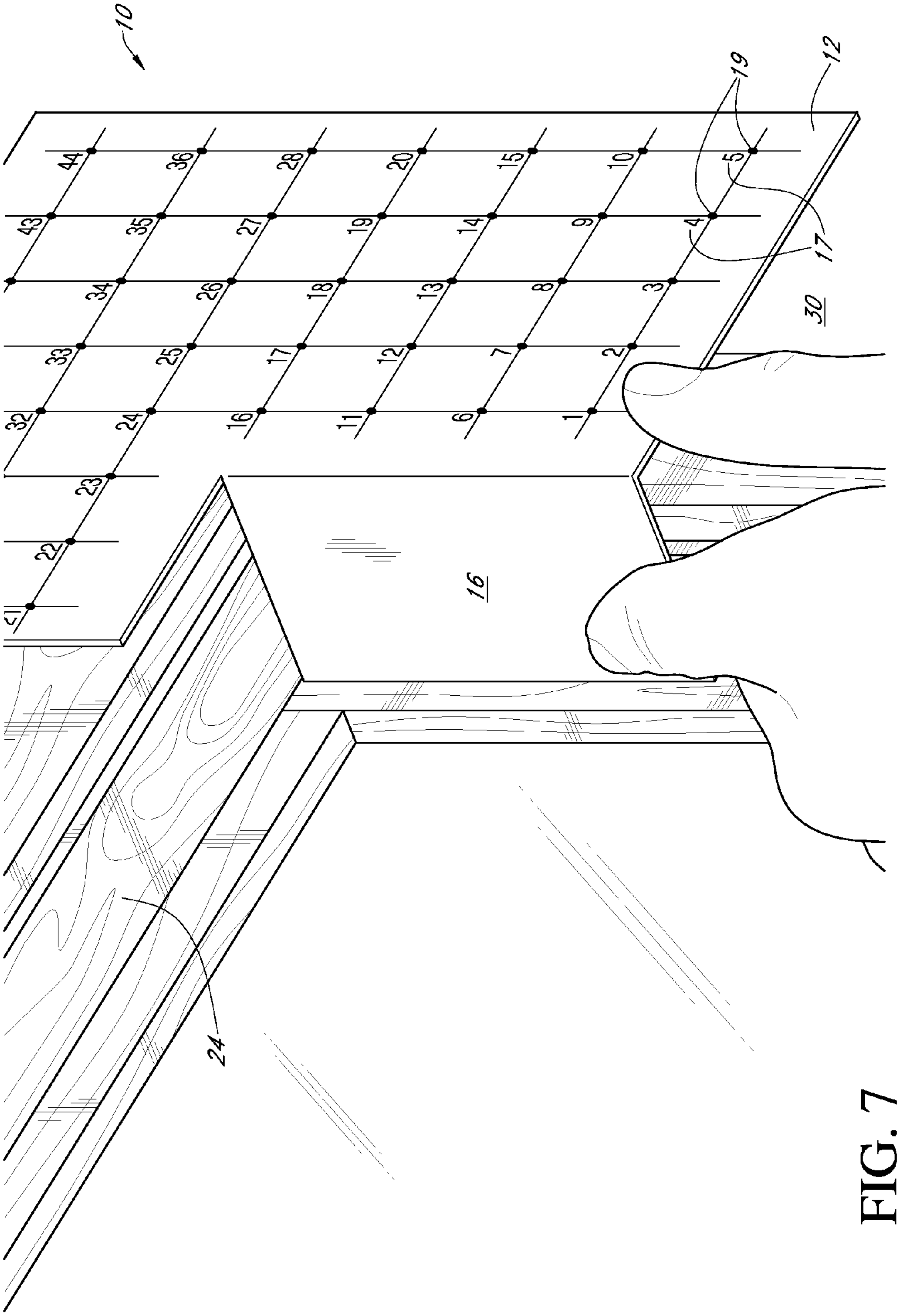
FIG. 7 provides a detailed view of the flap when the flap is positioned about the window frame interior side.
Figure 8:
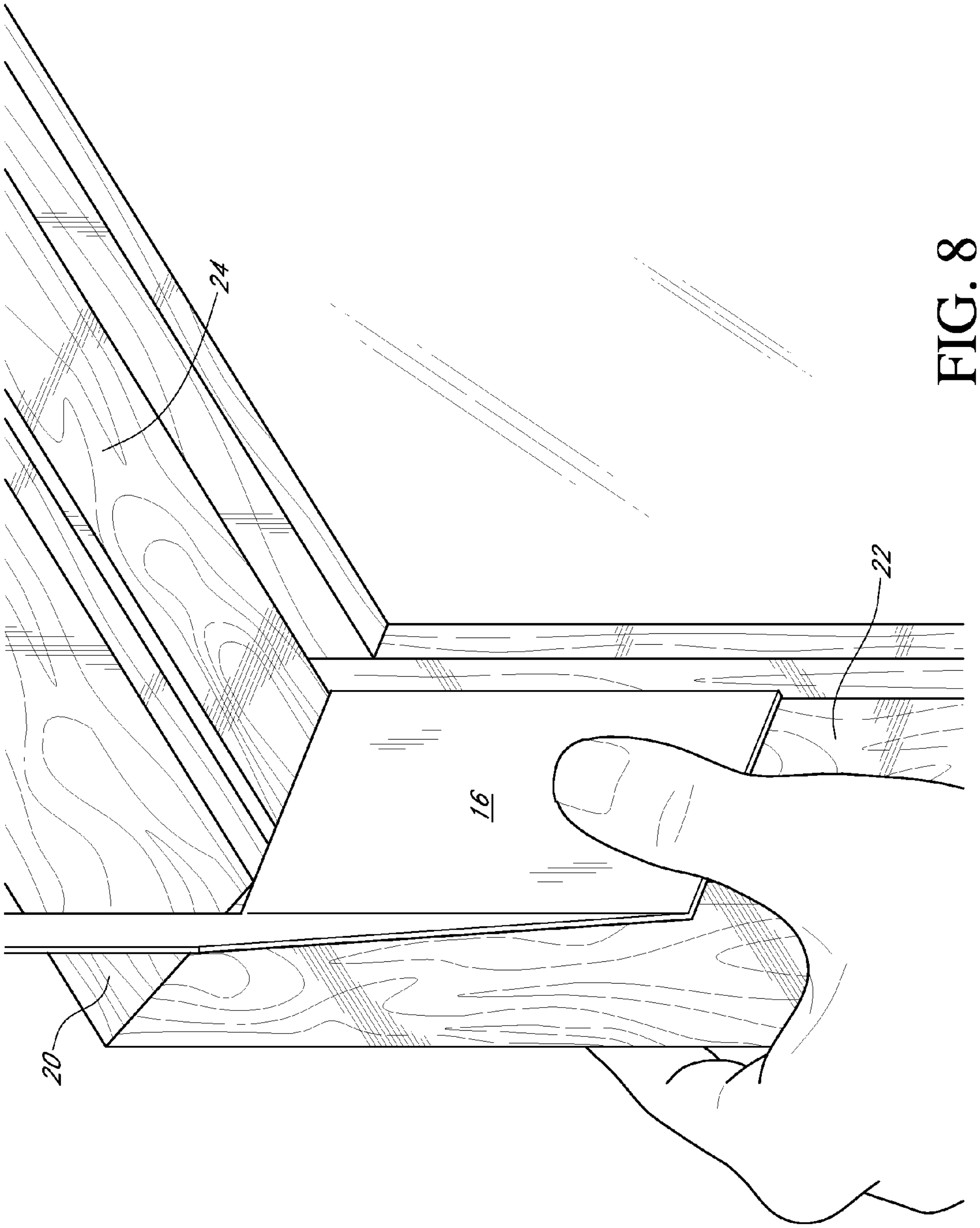
FIG. 8 provides a detailed view of the flap when the flap is positioned about the window frame interior side opposite of the side shown in FIG. 7.

Another method for using the positioner 10 is illustrated by FIGS. 7 and 8. In those figures, the flap 16 is positioned adjacent a window frame interior side 22. This method of use would be especially convenient for embodiments of the positioner 10 wherein the flap 16 includes a grid (not shown), apertures (not shown), and indicators (not shown). FIG. 7 indicates how the flap 16 would be used to position the first side of a window treatment along a first window frame interior side 22. FIG. 8 indicates how the flap 16 would be used to position the second side of a window treatment along a second window frame interior side 22. This method for positioning a window treatment on the window frame interior sides 22 is completely analogous to that described above, wherein the same indicators 17 on each side of the flap 16 would correspond to the same aperture 19. This method is especially useful for recessed windows (not shown) wherein the window treatment is positioned on the sides of the recess.

Figure 9:
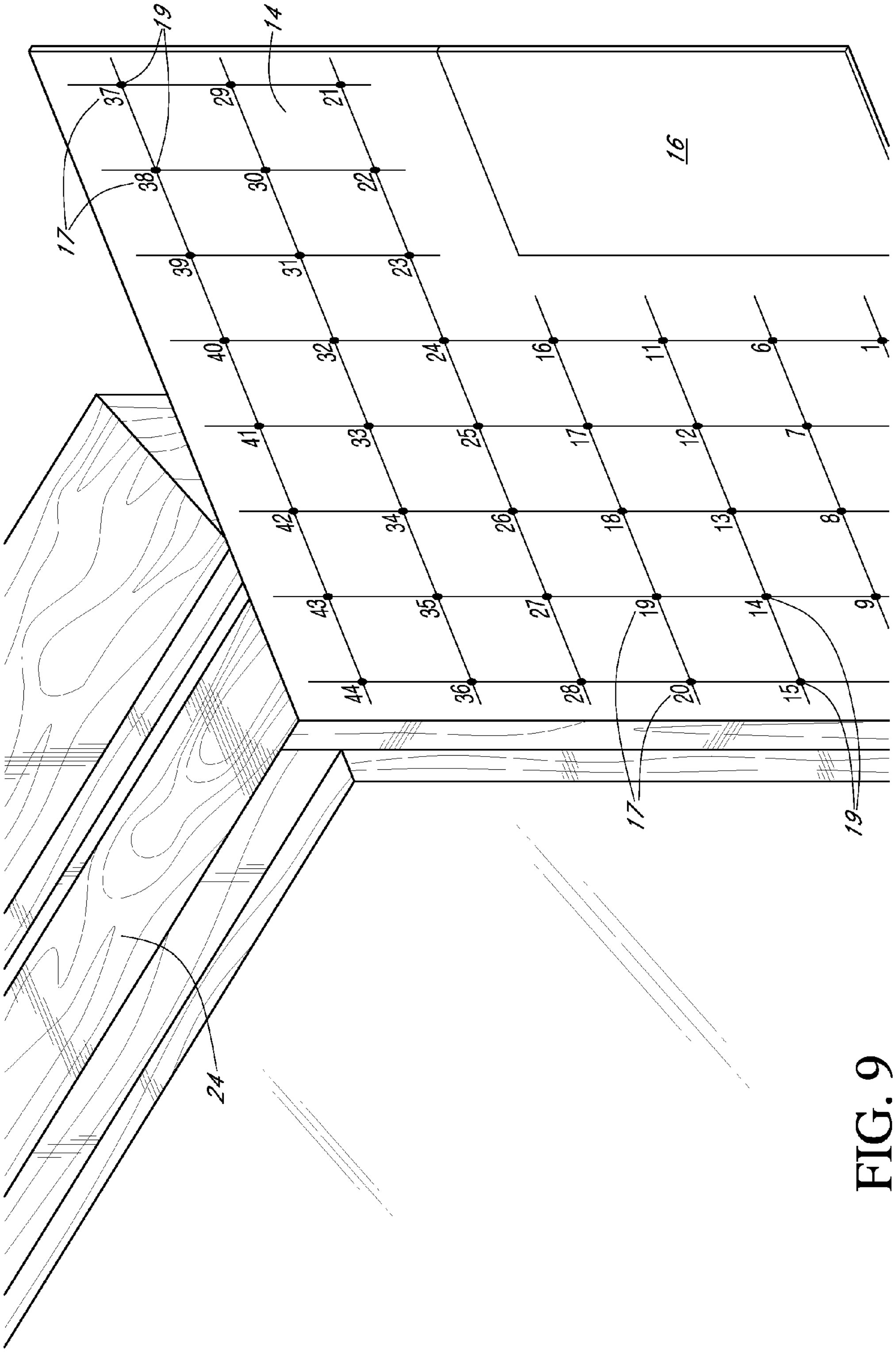
FIG. 9 provides a detailed view of the positioner placed about the window frame interior side.

Yet another method for using the positioner 10 is illustrated in FIG. 9. In FIG. 9, instead of using the flap 16 to locate the position of a window treatment on the window frame interior side 22, the positioner 10 itself is used. As with the methods described above, the correct position for the window treatment on the opposite window frame interior side 22 may be located using the indicator 17 with the same label on the other side of the positioner 10 and the corresponding aperture 19.

Figure 10:
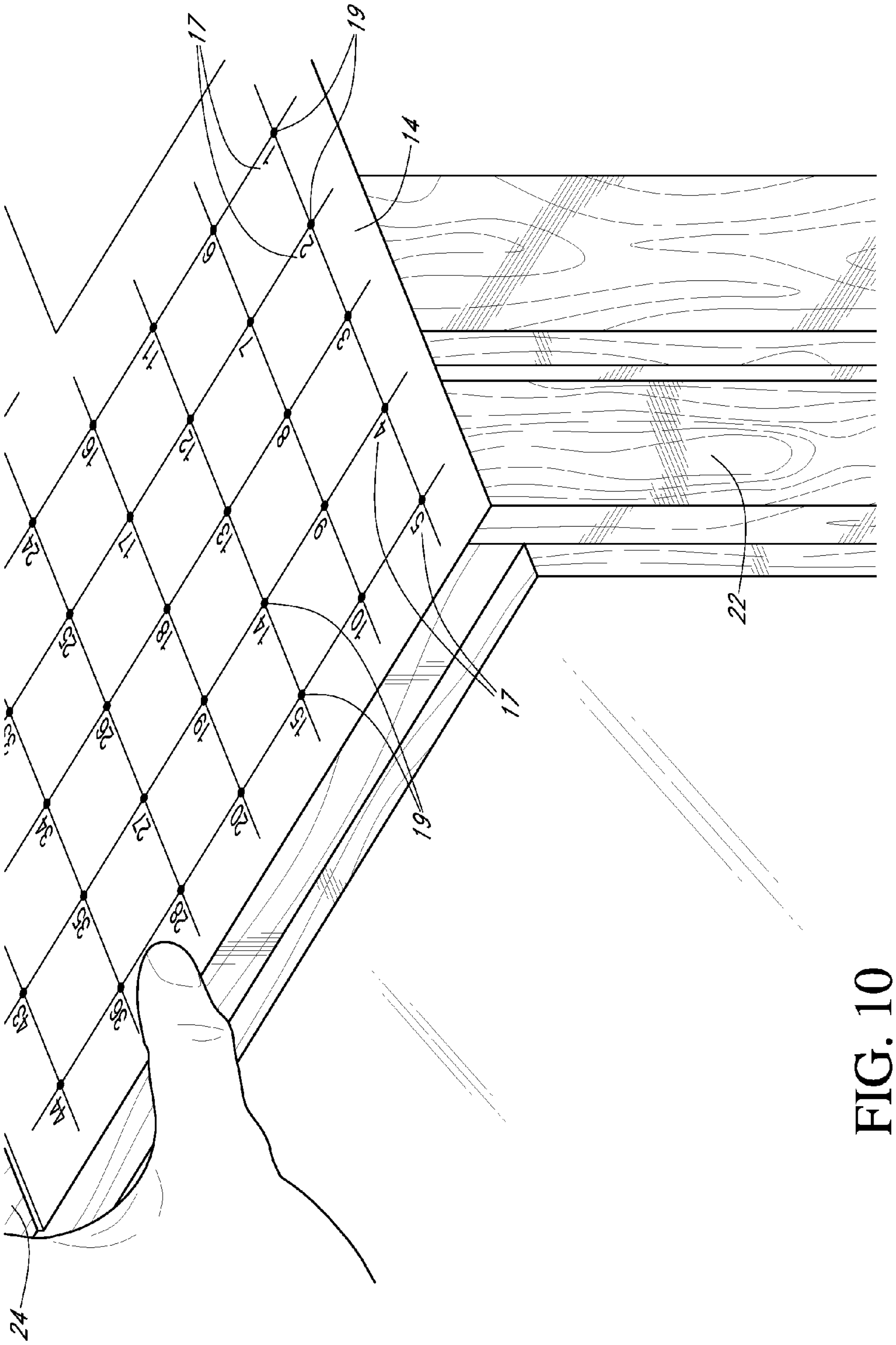
FIG. 10 provides a detailed view of the positioner placed about the window frame interior top.

Still another method of using the positioner 10 is shown in FIG. 10. In FIG. 10, the positioner 10 is being used to locate the proper position for a window treatment affixed to a window frame interior top 24. As with the other methods described herein, the user may simply flip the positioner 10 over to the opposite side and find the indicator 17 having the same label and make a mark using the corresponding aperture 19. The flap 16 may also be used in the manner shown in FIG. 10 in certain embodiments, as will be obvious to those skilled in the art in light of the present disclosure.

Figure 11:
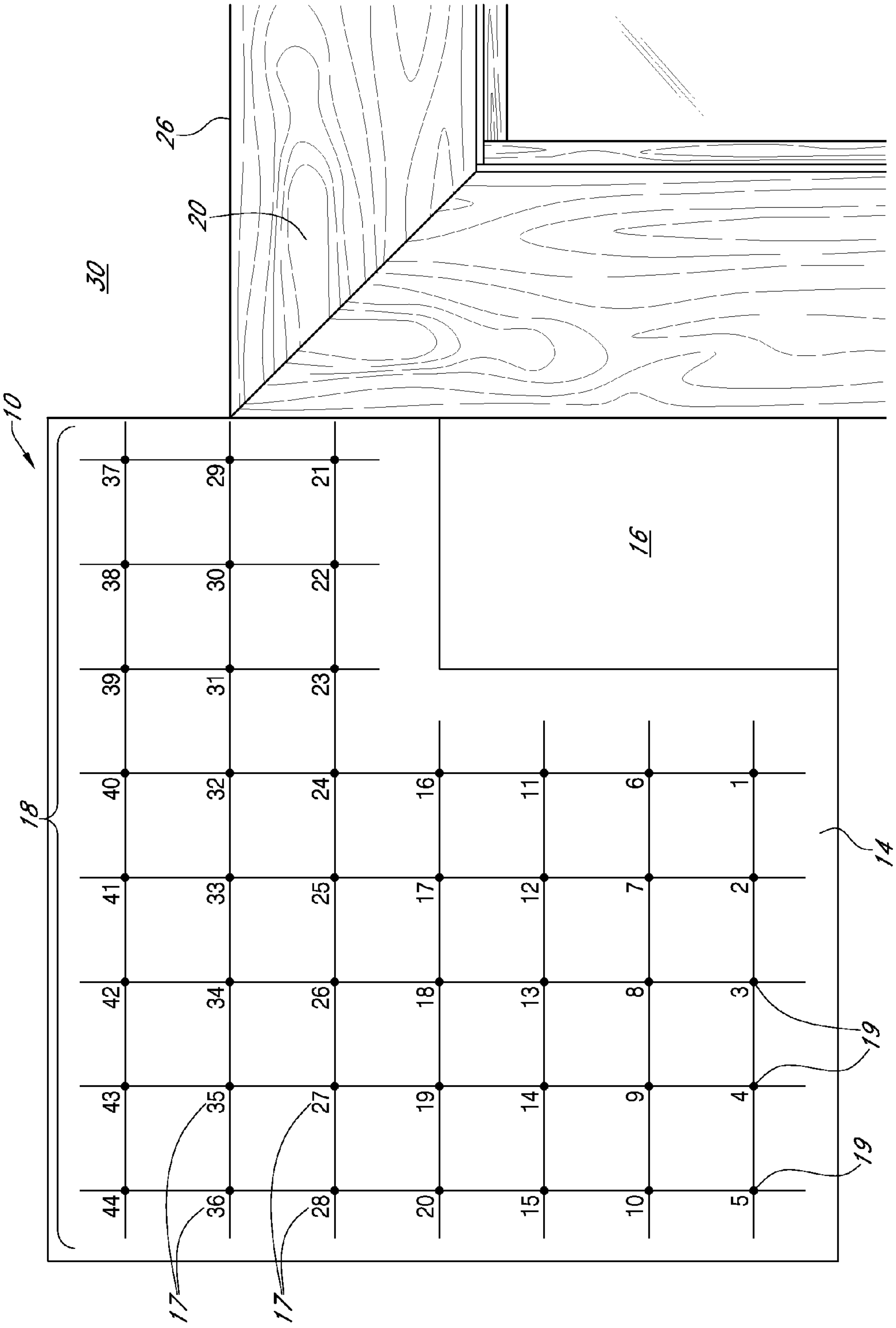
FIG. 11 provides a full view of the positioner second side with the positioner placed about a window frame exterior.

FIG. 11 shows another method of using the positioner 10. The method shown in FIG. 11 is most analogous to that shown in FIGS. 4 and 5, wherein the positioner 10 is shown being used to locate the two sides of a window treatment on a window frame exterior 26. However, in FIG. 11, the user is simply using the periphery of the positioner 10 and not the flap 16. As with the other methods disclosed herein, the user may simply flip the positioner 10 to the other side (such that the opposite side of the positioner 10 is adjacent the wall 30) and mark the aperture 19 adjacent the indicator 17 with the same label. Because all four edges of the positioner 10 are square, the method shown in FIG. 11 ensures the relative ends of the window treatment will be positioned correctly with respect to the window frame 20.

Other methods of using the positioner 10 will become apparent to those skilled in the art in light of the present disclosure. Accordingly, the methods and embodiments pictured and described herein are for exemplary purposes only. The positioner 10 may also be used to position structures other than window treatments adjacent windows, and therefore the specific structure the positioner 10 is used to mount, whether on the interior or exterior of a building, in no way limits the scope of the positioner 10.

The positioner 10 may be constructed of any suitable material known to those skilled in the art. The embodiment as pictured herein is constructed of cardboard, but other embodiments may be constructed of other cellulosic materials, thin metal alloys, polymers, etc., or any combinations thereof. It is contemplated that one embodiment of the positioner 10 will be integrated into existing packaging for window treatments or other structures. For example, if the positioner 10 was constructed of cardboard, the positioner 10 may be integrated into the cardboard packaging of a blind, curtain, or other window treatment. Furthermore, the positioner 10 may simply be marketed and packaged with a window treatment or other item to be mounted to a wall 30 rather than integrally formed with the packaging for such an item.

It should be noted that the present invention is not limited to the specific embodiments pictured and described herein, but is intended to apply to all similar apparatuses and methods for positioning a window treatment or other structure adjacent an object with a right angle. Modifications and alterations from the described embodiments will occur to those skilled in the art without departure from the spirit and scope of the present invention.

Furthermore, modifications and alterations from the described embodiments will occur to those skilled in the art without departure from the spirit and scope of any method of use of the present invention. While certain methods have been described in connection with specific embodiments thereof, it will be understood that it is capable of further modifications, and this application is intended to cover any variations, uses, or adaptations of the method following, in general, the principles of the method and including such departures from the present disclosure as come within known or customary practice within the art to which the method pertains and as may be applied to the essential features herein before set forth, and as follows in the scope of the appended claims.

The invention claimed is:

1. A positioner comprising:

a. a positioner first side;

b. a positioner second side;

c. a flap hingedly mounted on said positioner, wherein said flap has a flap first side and a flap second side, and wherein said flap first side corresponds with said positioner first side and said flap second side corresponds with said positioner second side;

d. a plurality of indicators on both said positioner first and second sides, wherein said indicators are located the same distance from the periphery of said positioner on both said positioner first and second sides;

e. a plurality of apertures, wherein each said aperture extends from said positioner first side to said positioner second side, and wherein each said indicator corresponds to one said aperture; and f. a plurality of grids on both said positioner first and second sides, wherein said grids are located the same distance from the periphery of said positioner on both said positioner first and second sides, and wherein said grids are oriented equally and have identical dimensions on both said positioner first and second sides.

2. The positioner according to claim 1 wherein said plurality of grids forms a plurality of equally sized squares.

3. The positioner according to claim 2 wherein the peripheries of said plurality of squares are further defined as being oriented parallel to the periphery of said positioner first and second sides.

4. The positioner according to claim 3 wherein the plurality of apertures are further defined so that each said individual aperture is positioned at a node of said plurality of grids.

5. The positioner according to claim 4 wherein said plurality of grids is further defined such that the distance from each node is one inch.

6. The positioner according to claim 4 wherein said plurality of grids is further defined such that the distance from each node is one centimeter.

7. The positioner according to claim 1 further comprising:

a. a plurality of indicators on both said flap first and second sides, wherein said indicators are located the same distance from the periphery of said flap on both said flap first and second sides;

b. a plurality of apertures formed in said flap, wherein each said aperture extends from said flap first side to said flap second side, and wherein each said indicator on said flap corresponds to one aperture in said flap; and c. a plurality of grids on both said flap first and second sides, wherein said grids are located the same distance from the periphery of said flap on both said flap first and second sides, and wherein said grids are oriented equally and have identical dimensions on both said flap first and second sides.

8. The positioner according to claim 7 wherein said plurality of grids on said flap forms a plurality of equally sized squares.

9. The positioner according to claim 8 wherein the peripheries of said plurality of squares on said flap are further defined as being oriented parallel to the periphery of said flap first and second sides.

10. The positioner according to claim 9 wherein said plurality of apertures in said flap are further defined so that each said individual aperture is positioned at a node of said plurality of grids on said flap first and second sides.

11. The positioner according to claim 10 wherein said plurality of grids on said flap is further defined such that the distance from each node is one inch.

12. The positioner according to claim 10 wherein said plurality of grids on said flap is further defined such that the distance from each node is one centimeter.

13. The positioner according to claim 1 wherein said positioner is formed as an integral part of the packaging of an item to be mounted on a wall.

* * * * *